(12) United States Patent
Kimura et al.

(10) Patent No.: US 8,869,620 B2
(45) Date of Patent: Oct. 28, 2014

(54) AIRBORNE ULTRASONIC SENSOR

(75) Inventors: Tomonori Kimura, Tokyo (JP); Koji Ibata, Tokyo (JP); Satoru Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 323 days.

(21) Appl. No.: 13/498,050

(22) PCT Filed: Oct. 19, 2009

(86) PCT No.: PCT/JP2009/067986
§ 371 (c)(1),
(2), (4) Date: Mar. 23, 2012

(87) PCT Pub. No.: WO2011/048649
PCT Pub. Date: Apr. 28, 2011

(65) Prior Publication Data
US 2012/0204647 A1 Aug. 16, 2012

(51) Int. Cl.
*G01H 5/00* (2006.01)
*G01S 7/521* (2006.01)
*G01S 15/93* (2006.01)

(52) U.S. Cl.
CPC ........... *G01S 7/521* (2013.01); *G01S 2015/938* (2013.01); *G01S 15/931* (2013.01)
USPC .............................................. 73/597; 73/632

(58) Field of Classification Search
USPC ................ 73/579, 632; 340/435, 693.11, 943
See application file for complete search history.

(56) References Cited

U.S. PATENT DOCUMENTS

| | | | | |
|---|---|---|---|---|
| 5,531,118 A | * | 7/1996 | Knoll et al. | 73/628 |
| 6,987,707 B2 | * | 1/2006 | Feintuch et al. | 367/99 |
| 7,240,555 B2 | * | 7/2007 | Kawashima | 73/632 |
| 7,278,314 B2 | * | 10/2007 | Sato et al. | 73/602 |
| 7,398,687 B2 | * | 7/2008 | Nakajima et al. | 73/661 |

(Continued)

FOREIGN PATENT DOCUMENTS

| | | |
|---|---|---|
| DE | 10 2006 038 598 A1 | 5/2008 |
| JP | 53 34489 | 3/1978 |

(Continued)

OTHER PUBLICATIONS

U.S. Appl. No. 13/822,308, filed Mar. 12, 2013, Ibata, et al.

(Continued)

*Primary Examiner* — J M Saint Surin
(74) *Attorney, Agent, or Firm* — Oblon, Spivak, McClelland, Maier & Neustadt, L.L.P.

(57) ABSTRACT

An airborne ultrasonic sensor is obtained in which a sensor body and a housing have an integrated structure, and which can reduce spurious waves which propagate through the housing to arrive at the sensor body. The sensor is provided with the sensor body that radiates ultrasonic waves into air and at the same time receives reflected waves from a reflection source which exists in the air, a transmission and reception device that drives the sensor body and at the same time obtains a distance to the reflection source or a propagation speed of sound based on the reflected waves, and the housing that has the sensor body fixedly secured thereto with an integrated structure. The housing has groove portions which are different in acoustic impedance from their surroundings. The groove portions are arranged obliquely regarding either one of a horizontal direction or a vertical direction of the sensor body.

6 Claims, 7 Drawing Sheets

(56) References Cited

U.S. PATENT DOCUMENTS

| | | |
|---|---|---|
| 8,125,321 B2 | 2/2012 | Kojima et al. |
| 2006/0158066 A1 | 7/2006 | Oda et al. |
| 2007/0062292 A1 | 3/2007 | Sato et al. |
| 2007/0079661 A1 | 4/2007 | Yoshida et al. |
| 2008/0089177 A1 | 4/2008 | Kojima et al. |

FOREIGN PATENT DOCUMENTS

| | | | |
|---|---|---|---|
| JP | 9 89853 | | 4/1997 |
| JP | 10 123236 | | 5/1998 |
| JP | 2007 107954 | | 4/2007 |
| JP | 2007083916 | * | 4/2007 |
| JP | 2007 114182 | | 5/2007 |
| JP | 2008 96113 | | 4/2008 |

OTHER PUBLICATIONS

Extended European Search Report issued Feb. 7, 2013, in European Patent Application No. 09850547.2.

International Search Report issued on Nov. 17, 2009 in PCT/JP09/67986 filed on Oct. 19, 2009.

* cited by examiner

AIRBORNE ULTRASONIC SENSOR

TECHNICAL FIELD

The present invention relates to an airborne ultrasonic sensor which radiates ultrasonic waves into the air and receives reflected waves from a reflection source (object) which exists in the surroundings, whereby it obtains the distance to the reflection source or the propagation speed of sound in the surroundings. In particular, the invention relates to a technique for reducing spurious waves which propagate through a housing with the body of the sensor mounted thereon, and which arrives at the body of the sensor.

BACKGROUND ART

In general, an airborne ultrasonic sensor is a device that serves to transmit ultrasonic waves into the air and receive the ultrasonic waves which have been reflected by an object, wherein it is applied to a variety of kinds of fields such as one for vehicle mounting, etc.

First, as a conventional device, there has been proposed an obstacle detection device for mounting on a vehicle, which is provided with an airborne ultrasonic sensor (for example, see a first patent document).

In the conventional device described in the first patent document, in place of a structure in which a bumper of a vehicle is slotted to expose an acoustic radiation surface, a concave portion is formed in a rear surface of the bumper, and a sensor is arranged in the concave portion, thereby preventing the appearance of the bumper from being spoiled due to the formation of the sensor in the concave portion.

However, according to the above-mentioned first patent document, the bumper and the sensor are unified with each other, so there is a possibility that the sensor may receive spurious waves propagating through the bumper.

Accordingly, in order to prevent the reception of such spurious waves, there has also been proposed a device which has a groove portion formed in a bumper (for example, see a second patent document).

In the obstacle detection device described in the second patent document, the construction thereof is such that the groove portion and a protruded portion are formed in the surroundings of a sensor which is arranged on the rear surface of the bumper, thereby preventing spurious signals due to vibrations from being transmitted or received.

However, according to the above-mentioned second patent document, no assumption is made on the spurious waves which would be generated by reflection waves from a reflection source being incident to the bumper, and hence, in actuality, there can also be well considered a situation where the spurious waves generated by the incidence of the reflection waves to the bumper propagate through the bumper, so that they may be received by the sensor.

Here, reference will be made to a propagation path of spurious waves and influences due to the spurious waves in an airborne ultrasonic sensor, while referring to FIG. 7.

Figure 7:
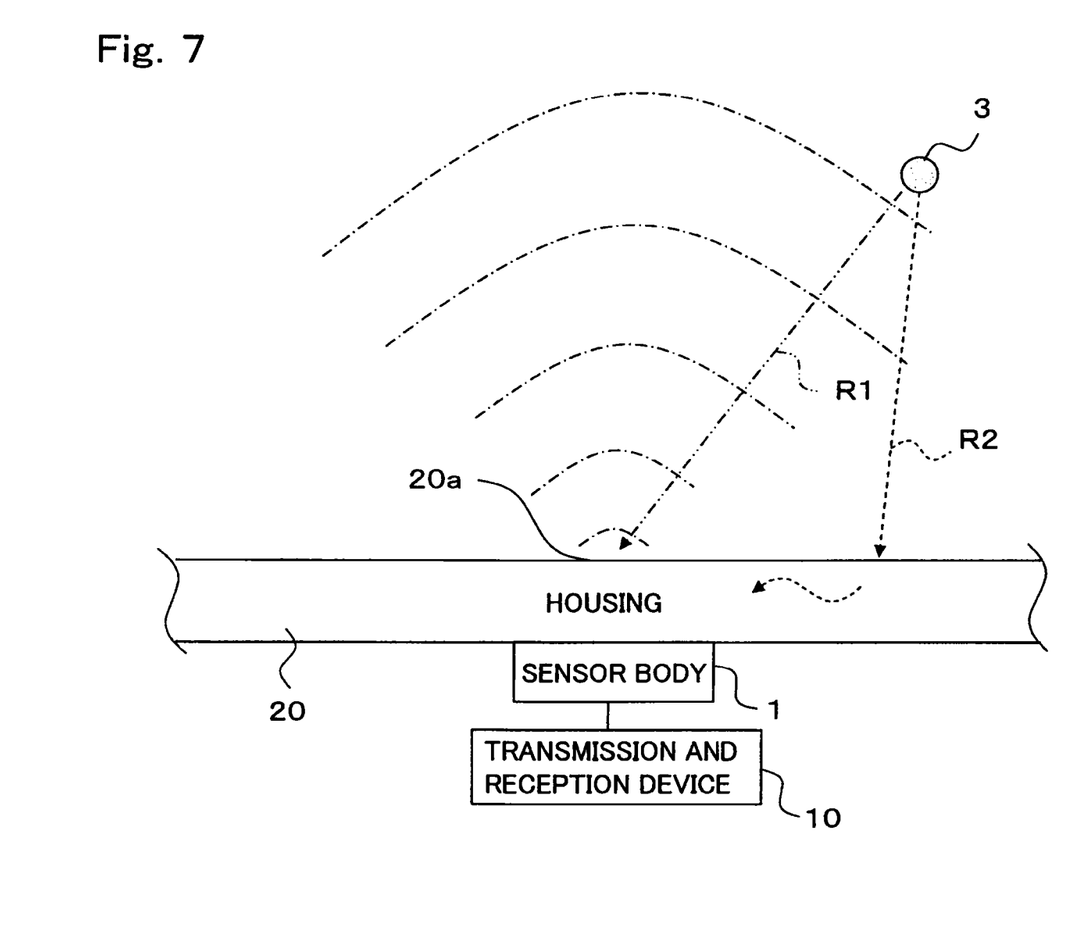
FIG. 7 is a plan view showing a conventional airborne ultrasonic sensor.

FIG. 7 is a plan view showing the airborne ultrasonic sensor in the past.

In FIG. 7, a sensor body 1 is mounted on a rear surface of a housing (a bumper in the case of the airborne ultrasonic sensor for vehicle mounting) 20.

The transmission and reception device 10 for electrical signals is connected to the sensor body 1, and the sensor body 1 is caused to excite by an excitation signal which is inputted from the transmission and reception device 10, thus sending ultrasonic waves.

The ultrasonic waves sent by the sensor body 1 propagate through the housing 20 from a radiation surface 20a thereof to the outside.

The ultrasonic waves having propagated to the outside through the housing 20 are reflected by a reflection source 3 (a surrounding object), so that a part (spurious wave) of the reflected waves is received by the sensor body 1 through a path R1 and the housing 20, and is converted into an electrical signal.

On the other hand, the reflected waves from the reflection source 3 propagate not only in the direction of the sensor body 1, but also in a wide range of directions, and hence, they of course propagate in directions different from the direction of the sensor body 1, too, and there also exist reflected waves (spurious waves) which vibrate the housing 20, as shown in a path R2.

When the housing 20 vibrates, the vibration (see a wave arrow of a broken line) will propagate through the housing 20, and will arrive at the sensor body 1.

That is, as propagation paths through which the reflected waves from the reflection source 3 are received by the sensor body 1, there exist two paths including the path R1 (in which the reflected waves propagate directly in the direction of the sensor body 1 so as to be received thereby), and the path R2 (in which the vibration of the housing 20 propagates through the housing 20 so as to be received by the sensor body 1).

In cases where the two propagation paths exist as mentioned above, when a difference between the propagation paths is "a natural number times of the wave length", the reception signals received through the two propagation paths act to strengthen each other, but on the contrary, when the difference is "a natural number times of the wave length+a half wave length", the reception signals received through the two propagation paths will mutually weaken each other.

That is, when consideration is given to the interference state of the two reception signals including the spurious waves, in cases where the difference between the propagation paths is one wave length, the two reception signals interfere with each other to strengthen each other, so that the amplitude of the composite or synthesized wave thereof becomes larger. On the other hand, in cases where the difference between the propagation paths is a half wave length, the two reception signals interfere with each other to weaken each other, so that the amplitude of the composite wave becomes smaller.

For example, under the conditions that the difference between the propagation paths is one wave length, and that the amplitudes of the two reception signals are made to strengthen each other, in cases where the airborne ultrasonic sensor is applied to a system which estimates the size of the reflection source 3 according to the amplitude of the composite wave, the size of the reflection source 4 may be overestimated.

On the other hand, when the difference between the propagation paths is a half wave length and the amplitude of the composite wave becomes smaller, it may, as a result, become difficult to detect the reflection source 3.

In addition, even in cases where the two reception signals do not interfere with each other, the vibration duration time of the composite wave becomes longer, as a result of which the resolution of the airborne ultrasonic sensor may be degraded.

PRIOR ART REFERENCES

Patent Documents

First Patent Document: Japanese patent application laid-open No. H10-123236

Second Patent Document: Japanese patent application laid-open No. 2008-96113

SUMMARY OF THE INVENTION

Problems to be Solved by the Invention

In the conventional airborne ultrasonic sensor, in cases where the sensor body 1 and the housing 20 have an integrated structure, as shown in FIG. 7, as the reception signals, there exist not only necessary waves which are directly received through the path R1 but also the spurious waves which are indirectly received through the path R2 and the housing 20, and hence, there has been a problem that it becomes difficult to obtain a stable reception signal.

The present invention has been made in order to solve the problem as referred to above, and has for its object to obtain an airborne ultrasonic sensor in which a sensor body and a housing has an integrated structure, and which is capable of reducing spurious waves which propagate through the housing to arrive at the sensor body.

Means for Solving the Problems

An airborne ultrasonic sensor according to the present invention is provided with a sensor body that radiates ultrasonic waves into air and at the same time receives reflected waves from a reflection source which exists in the air, a transmission and reception device that drives the sensor body and at the same time obtains a distance to the reflection source or a propagation speed of sound based on the reflected waves, and a housing that has the sensor body fixedly secured thereto with an integrated structure, wherein the housing has unique parts which are different in acoustic impedance from their surroundings, and the unique parts are arranged obliquely with respect to either one of a horizontal direction or a vertical direction of the sensor body.

Effect of the Invention

According to the present invention, by reflecting spurious waves by means of the unique parts, it is possible to suppress or reduce the spurious waves which would arrive at the sensor body, so that a stable reception signal can be obtained.

MODES FOR CARRYING OUT THE INVENTION

First Embodiment

Hereinafter, reference will be made to an airborne ultrasonic sensor according to a first embodiment of the present invention, while referring to FIG. 1 through FIG. 6.

Figure 1:
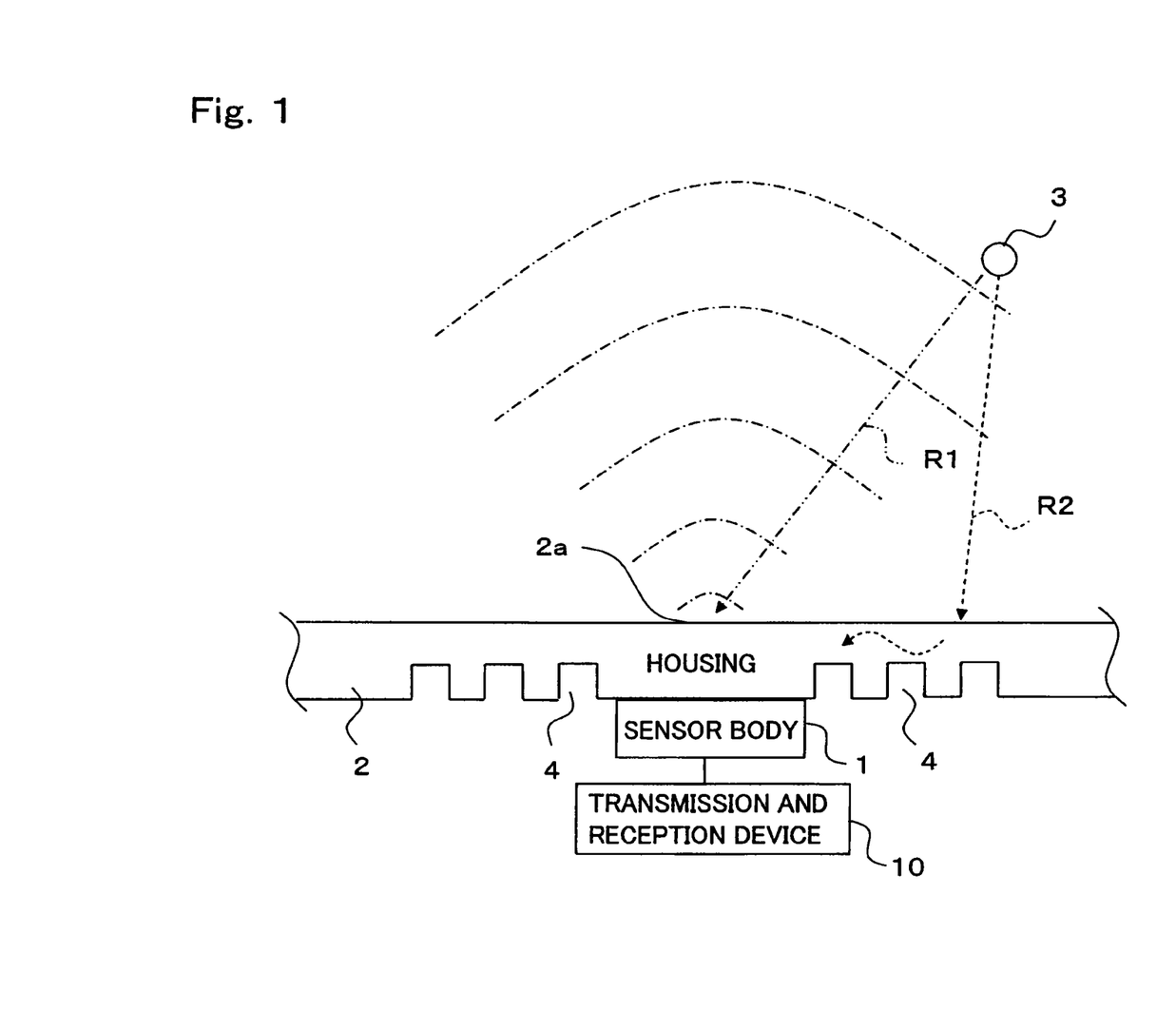
FIG. 1 is a plan view showing an airborne ultrasonic sensor according to a first embodiment of the present invention. (First Embodiment)
Figure 2:
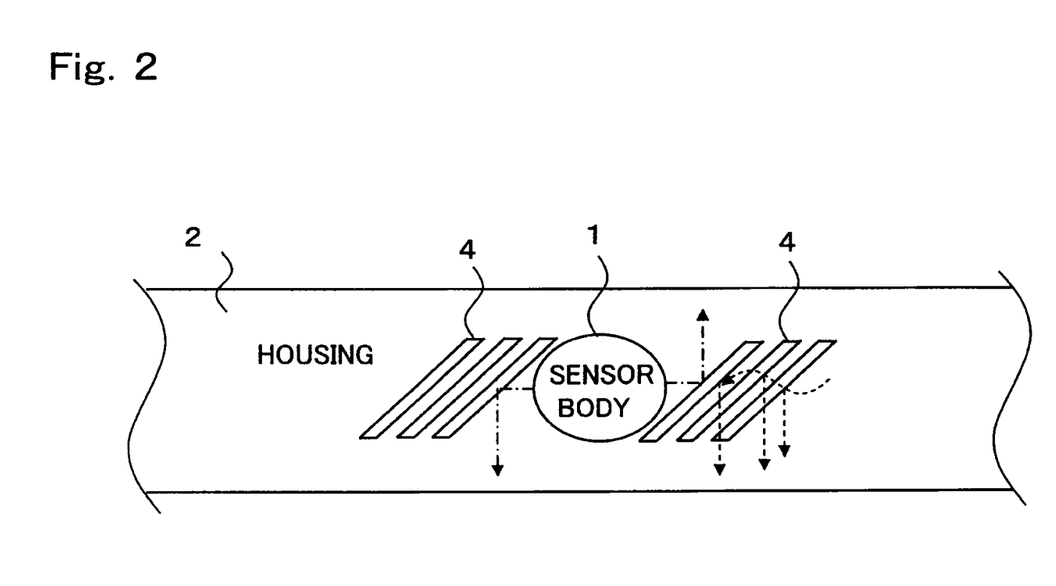
FIG. 2 is a front elevational view of the airborne ultrasonic sensor in FIG. 1. (First Embodiment)

FIG. 1 is a plan view showing the airborne ultrasonic sensor according to the first embodiment of the present invention, and FIG. 2 is a front elevational view of the airborne ultrasonic sensor of FIG. 1.

Figure 3:
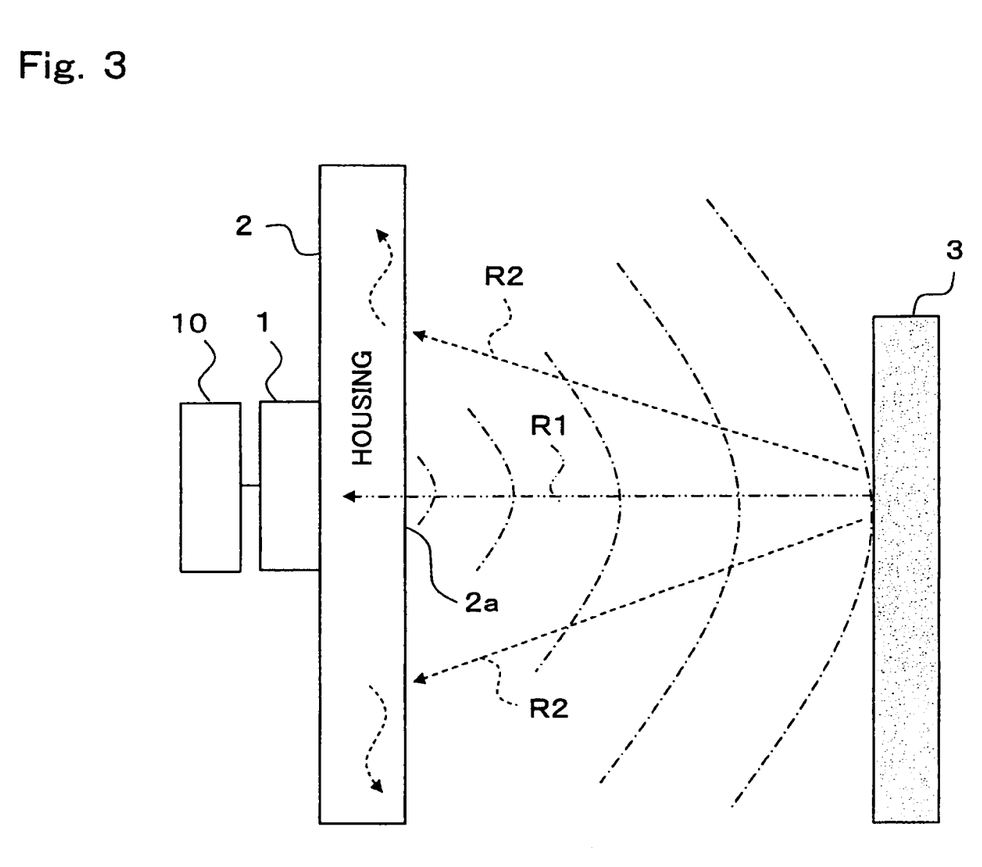
FIG. 3 is a side elevational view showing a reception state of the airborne ultrasonic sensor in FIG. 1 in cases where a reflection source is arranged in a vertical direction. (First Embodiment)
Figure 4:
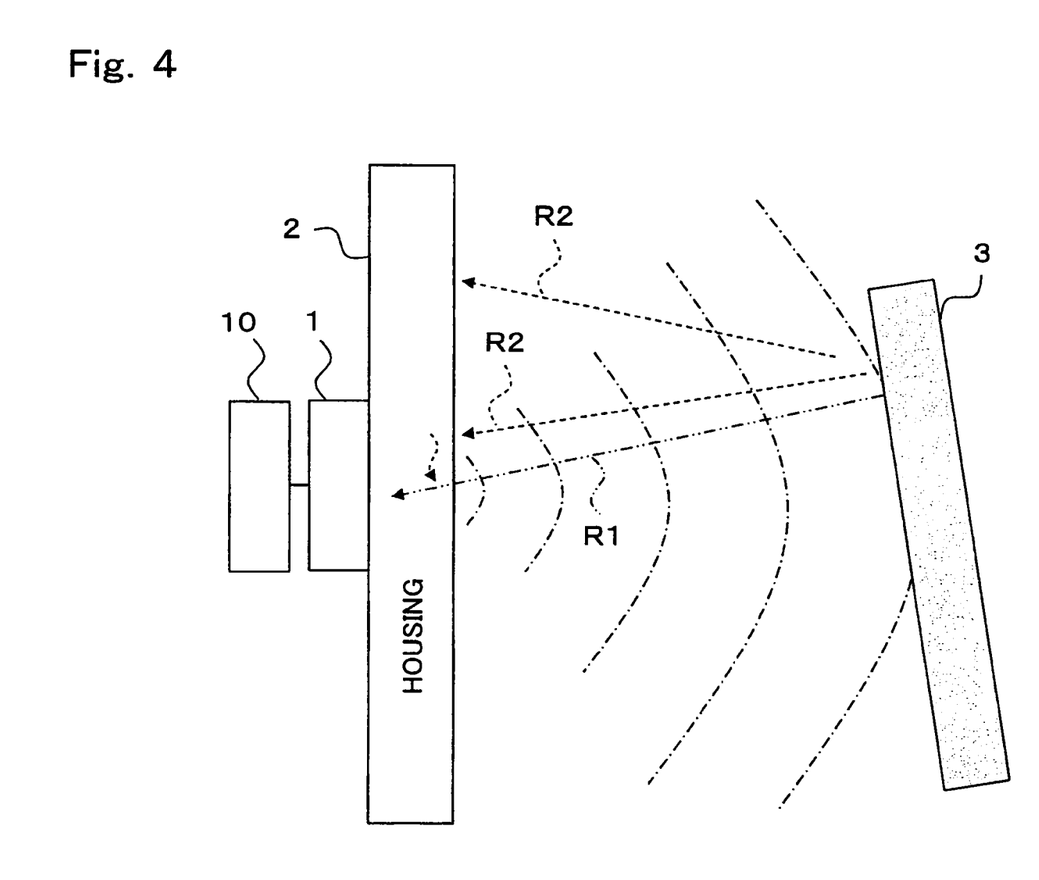
FIG. 4 is a side elevational view showing a reception state of the airborne ultrasonic sensor in FIG. 1 in cases where a reflection source is arranged in an inclined or oblilque manner. (First Embodiment)

In addition, FIG. 3 and FIG. 4 are side elevational views, respectively, showing the reception states of the airborne ultrasonic sensor of FIG. 1, and illustrate the cases where a path R1 and a path R2 of reflection waves reflected from a reflection source 3 are respectively different from each other.

Here, note that in FIG. 3 and FIG. 4, in order to avoid complicatedness, the illustration of groove portions 4 is omitted for the purpose of simplification.

Figure 5:
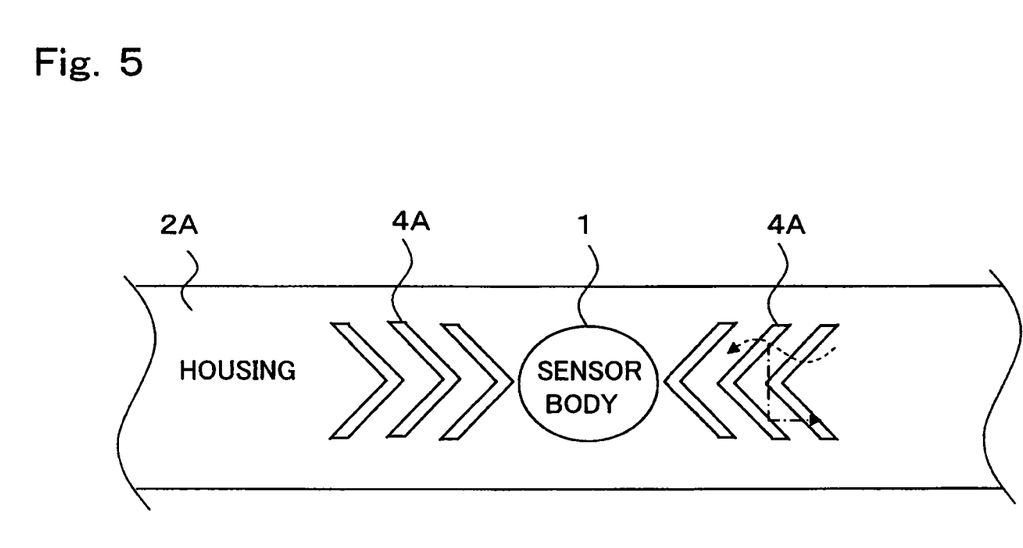
FIG. 5 is a front elevational view showing another example of the airborne ultrasonic sensor in FIG. 1. (First Embodiment)
Figure 6:
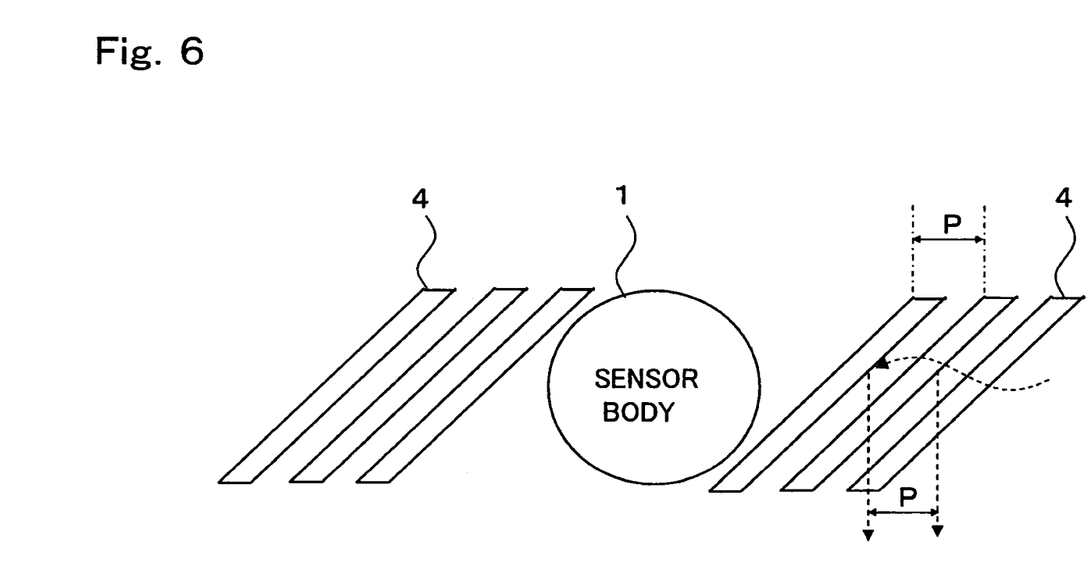
FIG. 6 is an explanatory view showing the pitch or interval of arrangement of groove portions in FIG. 2. (First Embodiment)

FIG. 5 is a front elevational view of another example of the airborne ultrasonic sensor of FIG. 1, and FIG. 6 is an explanatory view specifically showing the pitch or interval of arrangement of the groove portions 4 in FIG. 2.

In FIG. 1 and FIG. 2, the sensor body 1 is excited by an electrical signal from a transmission and reception device 10 to send or transmit ultrasonic waves, so that the ultrasonic waves are emitted from a radiation surface 2a of a housing 2.

The reflection waves reflected by the reflection source 3 is incident to the housing 2 through the paths R1 and R2, and signals received by the sensor body 1 are processed by the transmission and reception device 10, so that the relative distance to the reflection source 3, the propagation speed of sound and so on, are calculated.

At this time, on the housing 2 on which the sensor body 1 is mounted, the plurality of groove portions 4 are formed at equal pitches or intervals so as to cover the opposite side surfaces of the sensor body 1.

As a result of this, as shown in FIG. 1, the reflected waves (spurious waves) from the reflection source 3 having arrived at the housing 2 through the path R2 pass through the plurality of groove portions 4 (see a wave arrow of a broken line), so that they are then received by the sensor body 1.

At this time, the spurious waves propagating through the housing 2 while following the path R2 are reflected by the individual groove portions 4 at the time of passing through the plurality of groove portions 4, so that, by the time arriving at the sensor body 1, they will have small amplitudes In this manner, the spurious waves combined with the necessary waves which propagate to the sensor body 1 while following the intrinsic or original path R1 become small, so that the influence of the spurious waves on the necessary waves can be suppressed. As a result, a stable reception signal can be obtained in the sensor body 1.

Here, note that, as shown in FIG. 2, the individual groove portions 4 are arranged obliquely or inclinedly with respect to the extending direction of the housing 2, and further, they are arranged only in the right and left direction (i.e., in the horizontal direction) of the sensor body 1, but are not arranged in the vertical direction of the sensor body 1.

Here, first, reference will be made to the reason why the groove portions 4 are formed obliquely.

In case where the groove portions 4 are to be arranged vertically with respect to the extending direction of the housing 2, at the time of transmitting the ultrasonic waves, the groove portions 4 will reflect the transmitted waves, which have propagated from the sensor body 1 to the side face directions thereof, in their incident direction (in the direction of the sensor body 1).

As a result, at the time of transmission, the sensor body 1 will receive the reflected waves from the groove portions 4, and hence, a reception signal immediately after the sensor body 1 has been excited will continue for a long time.

In general, the reception signal continuing immediately after the excitation of the sensor body 1 is called the tailing of transmission, and when the tailing of transmission becomes long as mentioned above, it will become difficult to detect the reflection source 3 which exists at a short distance.

In order to suppress the tailing of transmission to a short time, it is necessary to reflect the waves propagated from the sensor body 1 at the time of transmission in directions different from the incident direction, and hence, the groove portions 4 are arranged obliquely, as shown in FIG. 2.

As described above, by arranging the groove portions 4 in an oblique manner, ithe waves propagating through the housing 2 in the extending direction thereof can be reflected in different directions, and at the same time, the tailing of transmission can be suppressed to be short.

Next, reference will be made to the reason why the groove portions 4 in FIG. 1 and FIG. 2 are formed with respect to only the horizontal direction of the sensor body 1, in association with the directivity of the sensor body 1 and the shape of the reflection source 3, while referring to FIG. 3 and FIG. 4.

An assumption is made that the airborne ultrasonic sensor according to the first embodiment of the present invention has a directivity in the vertical direction and a directivity in the horizontal direction which are different from each other, wherein it is assumed to have a sharp directivity with respect to the vertical direction, and a wide directivity with respect to the horizontal direction.

This is because if the directivity in the vertical direction is set to be wide, there will be a possibility that the reflection source 3 may be detected in error.

For example, in an airborne ultrasonic sensor for vehicle mounting, if it is assumed that the housing 2 is a bumper of a vehicle, in cases where the directivity in the vertical direction is wide, the reflection waves reflected from irregularities of a ground surface can be received, so that even in cases where any obstacle does not exist in the surroundings of the vehicle, an obstacle (the reflection source 3) will be detected in error.

Accordingly, in order to avoid the mis-detection of the reflection source 3 in the vertical direction, the directivity in the vertical direction of the sensor is set to be sharp, so that the reflection waves from the irregularities of the ground surface can not be received.

On the other hand, in many cases, the reflection source 3 (an electric pole, a road sign, or the like) is arranged upright at right angles to the ground surface, as shown in FIG. 3. As a result, when the waves are reflected with a sharp directivity by the reflection source 3 which is arranged upright at right angles to the ground surface, the reflected waves (spurious waves) through the path R2 will not return in the direction of the sensor body 1, but will propagate in upward and downward (vertical) emission directions (see wave arrows of broken lines in FIG. 3).

Therefore, even if the reflected waves (spurious waves) through the path R2 propagate through the interior of the housing 2, they are not received by the sensor body 1, and hence, it is not necessary to form the groove portions 4 in the vertical direction of the sensor body 1.

In addition, even in cases where the reflection source 3 is arranged obliquely with respect to the ground surface, as shown in FIG. 4, when the directivity in the vertical direction is sharp, only the reflected waves (spurious waves) in the path R2 of which the difference of the angle of gradient or inclination with respect to the path R1 is small are received by the sensor body 1, so a propagation path difference between the path R1 and the path R2 becomes very short.

Accordingly, the two reception signals in the sensor body 1 do not interfere with each other, so that they are received almost at the same timing to such an extent that it is difficult to distinguish the two reception signals from each other.

As a result, it is not necessary to arrange the groove portions 4 in the vertical direction, and besides, if the groove portions are arranged in the vertical direction, too, it may become a cause to increase the above-mentioned tailing at the time of transmission.

As described above, the airborne ultrasonic sensor according to the first embodiment (FIG. 1 and FIG. 2) of the present invention is provided with the sensor body 1 that radiates ultrasonic waves into air and at the same time receives reflected waves from the reflection source 3 which exists in the air, the transmission and reception device 10 that drives the sensor body 1 and at the same time obtains the distance to the reflection source 3 or the propagation speed of sound based on the reflected waves, and the housing 2 that has the sensor body 1 fixedly secured thereto with an integrated structure, wherein the housing 2 has the groove portions 4 (unique parts) which are different in acoustic impedance from their surroundings, and the groove portions 4 are arranged obliquely with respect to only the horizontal direction of the sensor body 1.

In addition, the groove portions 4 are arranged in pluralities in the right and left directions (i.e., in the horizontal directions) of the sensor body 1, respectively.

In this manner, by arranging the pluralities of groove portions 4 obliquely with respect to the right and left directions of the sensor body 1, it is possible to reduce the spurious waves which propagate through the housing 2 without making longer the tailing at the time of transmission, thus making it possible to obtain an airborne ultrasonic sensor which is capable of acquiring a stable reception signal.

Here, note that, in FIG. 1 and FIG. 2, the plurality of (e.g., three) groove portions 4 are arranged in each of the right and left portions of the sensor body 1, but the number of the groove portions 4 to be arranged may be arbitrary, and three or more groove portions may be used, or a single groove portion may be used as long as it is possible to reduce the spurious waves propagating through the housing 2 to a sufficient extent.

In addition, although in FIG. 2, the angle of gradient or inclination of the groove portions 4 is set to be about 45 degrees, it is not limited to 45 degrees, but can instead be set to an arbitrary angle as long as it is possible to reduce the spurious waves propagating through the housing 2 and at the same time to suppress the tailing at the time of transmission.

Moreover, instead of the oblique or sloped shape shown in FIG. 2, as shown in FIG. 5, groove portions 4A may be each formed in the shape of "a dogleg" on a surface of a housing 2A.

With the shape of FIG. 5, the reflected waves (spurious waves) having arrived at the housing 2A return in the propagated directions thereof, with respect to not only the horizontal direction but also the vertical direction, as a result of which it is possible to suppress the propagation of the reflected waves (spurious waves) in the vertical direction, too.

Further, in FIG. 2, the pitch or interval of arrangement of the groove portions 4 in the case of being arranged in plurality has not been described, but in the following, a condition of arrangement of the groove portions 4 will be explained while referring to FIG. 6.

The groove portions 4 are arranged for the purpose of reflecting the waves which propagate through the interior of the housing 2, and in cases where the reflected waves from the individual groove portions 4 are in phase with one another and are superimposed on one another, the reflection efficiency becomes the greatest.

In cases where the plurality of groove portions 4 are arranged at an angle of gradient or inclination of 45 degrees and at an interval of arrangement of P, as shown in FIG. 6, the difference in propagation path between the reflected waves from adjacent groove portions 4 (see arrows of broken lines) becomes "P".

Accordingly, when representing this by the use of the wave length λ of the waves which propagate through the interior of the housing 2, it is desirable for the interval of arrangement P to satisfy the following equation (1).

$$P = \lambda \times n \quad (1)$$

However, in equation (1) above, n is a natural number.

When the equation (1) is satisfied, for example, adjacent reflected waves in FIG. 6 (see the arrows of broken lines) become in phase, so the reflection efficiency becomes the greatest.

In this manner, by setting the interval of arrangement P so as to satisfy the equation (1), the difference in propagation distance between the reflected waves in the respective adjacent groove portions 4 becomes n (natural number) times of the wave length λ of the reflected waves, so that the effect of reducing spurious waves is made larger.

Here, note that in cases where the angle of gradient or inclination of the groove portions 4 is 45 degrees, the reflected waves become in phase with one another when the equation (1) is satisfied, but it goes without saying that a conditional expression in which the reflected waves become in phase differs according to the angle of gradient or inclination of the groove portions 4.

In addition, although in FIG. 2, the groove portions 4 (unique parts) are arranged obliquely with respect to only the horizontal direction of the sensor body 1, they may be arranged obliquely with respect to either one of the horizontal direction or the vertical direction of the sensor body 1.

Further, in the above description, in consideration of the ease of the manufacturing process, reference has been made to an example in which the groove portions 4 are formed in the housing 2 so as to reduce spurious waves, but the same operational effects can be achieved by other means or structure than the groove portions 4, as long as the waves propagating through the interior of the housing 2 can be reflected.

For example, even if convex portions are formed, instead of forming the groove portions 4, the waves propagating through the interior of the housing 2 can be reflected by the convex portions, thus making it possible to achieve the same operational effects.

In other words, if unique parts, which are different in acoustic impedance from their surroundings, are formed on a surface of the housing 2, spurious waves going to the sensor body 1 will be able to be reflected by the unique parts, and hence, the same operational effects as stated above can be obtained.

EXPLANATION OF REFERENCE NUMERALS AND CHARACTERS 1 sensor body, 2 housing, 3 reflection source, 4 groove portions (unique parts), 10 transmission and reception device, P interval of arrangement, R1 path of necessary waves, and R2 path of spurious waves.

The invention claimed is:

1. An airborne ultrasonic sensor comprising:
a sensor body that radiates ultrasonic waves into air and at the same time receives reflected waves from a reflection source which exists in said air;
a transmission and reception device that drives said sensor body and at the same time obtains a distance to said reflection source or a propagation speed of sound based on said reflected waves; and
a housing that has said sensor body fixedly secured thereto with an integrated structure;
wherein said housing has unique parts which are different in acoustic impedance from their surroundings; and
said unique parts are arranged obliquely with respect to either one of a horizontal direction or a vertical direction of said sensor body.

2. The airborne ultrasonic sensor as set forth in claim 1, wherein said unique parts each take the shape of a dogleg on a surface of said housing.

3. The airborne ultrasonic sensor as set forth in claim 1, wherein said unique parts are arranged obliquely with respect to either one of the horizontal direction or the vertical direction of said sensor body, in plurality at each side thereof.

4. The airborne ultrasonic sensor as set forth in claim 3, wherein said unique parts have an interval of arrangement set in such a manner that a difference in propagation distance between the reflected waves in respective adjacent unique parts become a natural number times of a wave length of said reflected waves.

5. The airborne ultrasonic sensor as set forth in claim 1, wherein said unique parts are formed of groove portions arranged in said housing.

6. The airborne ultrasonic sensor as set forth claim 1, wherein said unique parts are formed only in the horizontal direction of said sensor body.

* * * * *